United States Patent [19]

Visser

[11] 3,953,934
[45] May 4, 1976

[54] ODORIFEROUS FISHING DEVICE

[76] Inventor: Melvin J. Visser, 6212 Hampton, Portage, Mich. 49081

[22] Filed: Apr. 2, 1975

[21] Appl. No.: 564,279

[52] U.S. Cl. .............................. 43/42.06; 43/44.99; 239/54
[51] Int. Cl.² ........................................ A01K 85/00
[58] Field of Search ...................... 43/42.06, 44.99; 239/54

[56] References Cited
UNITED STATES PATENTS

| | | | |
|---|---|---|---|
| 2,620,227 | 12/1952 | Iwase et al. | 239/54 |
| 2,661,238 | 12/1953 | Osti et al. | 239/54 |
| 2,742,731 | 4/1956 | Lovelace | 43/44.99 |
| 2,797,519 | 7/1957 | Keller | 43/42.06 |
| 2,979,778 | 4/1961 | Fitz Simons | 43/42.06 X |
| 3,558,055 | 1/1971 | Storchheim | 239/54 |
| 3,579,895 | 5/1971 | Orn et al. | 43/42.06 X |

Primary Examiner—Louis G. Mancene
Assistant Examiner—Daniel J. Leach
Attorney, Agent, or Firm—Price, Heneveld, Huizenga & Cooper

[57] ABSTRACT

A fish attractant device and method for manufacturing the same adapted for use in its various embodiments as a sinker, lure, spinner, or the like to be immersed in water adjacent one or more hooks. The device is a rigid, sintered metal body having a network of interconnected pores filled with a fish attractant such as anise oil, menhaden oil, rhodinol, or bacon fat. The attractant is released into the water from the pores at a uniform, slow rate to attract fish to the hook. The method includes immersing the body in a container in a quantity of the fish attractant and evacuating the container to a predetermined vacuum to cause the attractant to impregnate the rigid body.

25 Claims, 12 Drawing Figures

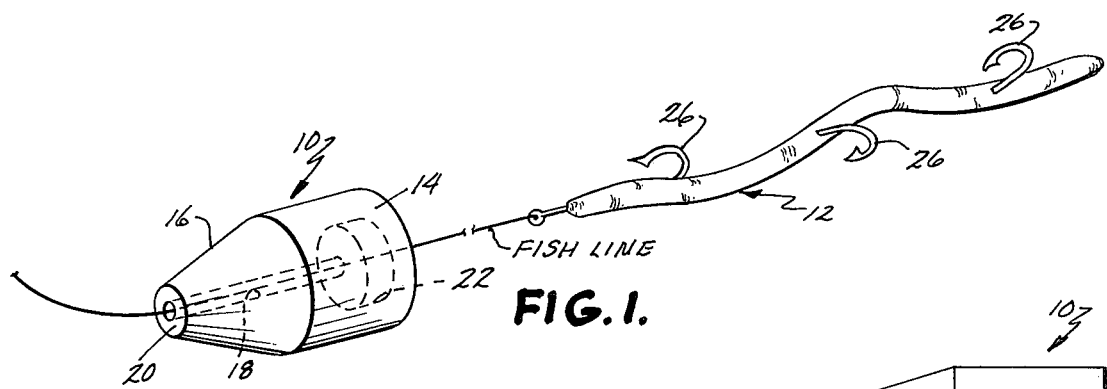
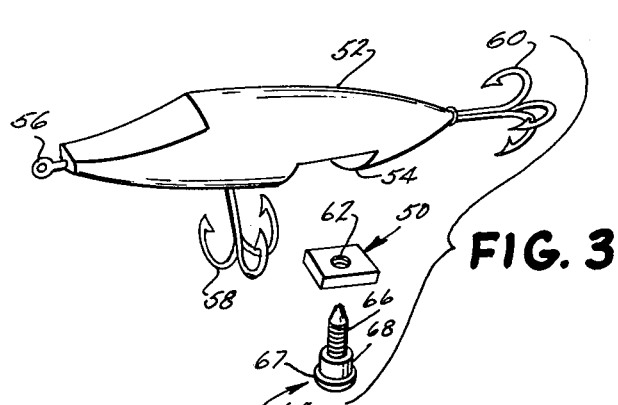
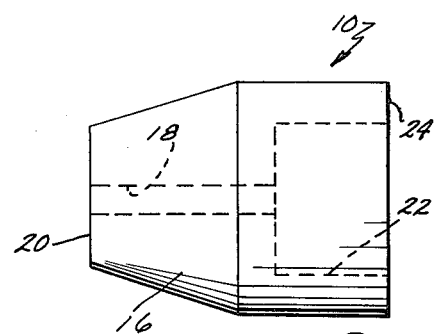
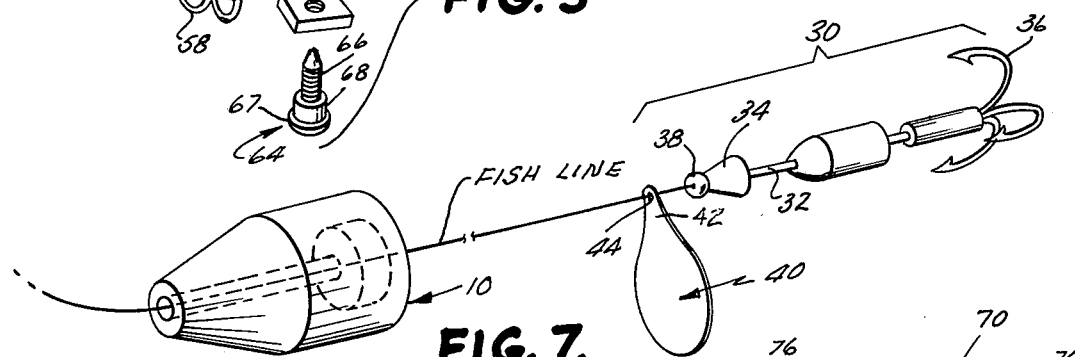
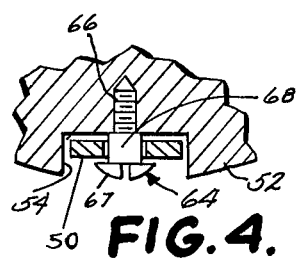
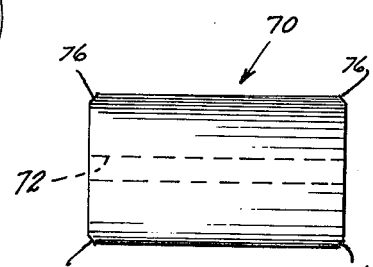
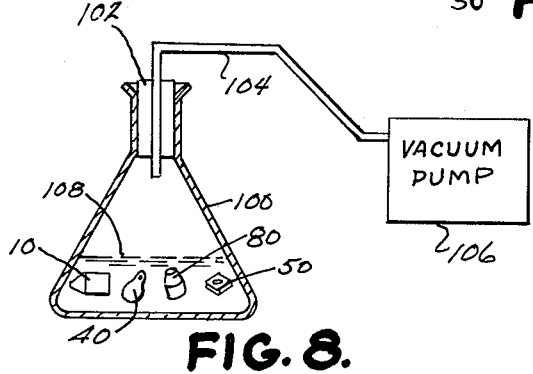
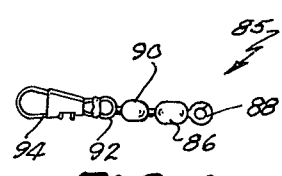

ODORIFEROUS FISHING DEVICE

BACKGROUND OF THE INVENTION

A wide variety of conventionally known fishing lures have been developed to attract fish to a hook to be caught. Many fishermen prefer live bait for this purpose. It has been found advantageous to use, in addition to live bait and artificial baits or lures, substances which are known to have fish-attractant properties. Such substances include oils and extracts which provide an odor in the water which attracts fish to the area.

Although it is desirable to use such fish attractants, a recurring problem has been the delivery of such attractants to the area where the fish will be caught beneath the water. One method has been to pour or spread the fish attractant on the water surface in the form of an oil. Since the oil remains on or near the surface and does not move with the lure, such method is of limited value especially when trolling.

Another method is to rub the desired oil, extract, or fish attractant directly on the exterior of the bait or lure being used. Contact with the water quickly disperses the small amount of oil retained on the surface of the lure necessitating frequent reapplication and preventing prolonged use of the enhanced lure. Similarly, filling a flexible, sponge-like lure or part thereof with fish attractant requires frequent reapplication and is not susceptible of prolonged use.

Yet another known method is to incorporate the fish attractant, oil, or extract directly in a plastic utilized to form flexible, plastic, artificial fishing worms. This method is described in U.S. Pat. No. 2,979,778. The described method has the drawbacks of requiring incorporation of the fish attractant during the molding and formation of the flexible lure thereby preventing reuse of the lure and incorporation of any more fish attractant in the lure unless the lure is melted and remolded. Moreover, certain fish attractants such as natural and biodegradable oils desirable for use in helping to catch fish are incompatible with plastic molding processes. Also, the flexible, plastic, molded lures are expensive to manufacture. Molding of the fish attractant directly in the flexible plastic lures does not assure a constant, uniform slow rate of entry of the attractant in the water around the lure to provide continuous attraction of fish to the adjacent hooks. Also, one is limited to a specific attractant lure.

The problem of delivery of the well-known fish attractant substances has been and remains the primary problem in the use of such substances.

SUMMARY OF THE INVENTION

The present invention provides a fishing device, fishing method, and method for manufacturing the device which is designed and especially adapted to overcome the problem of delivery of known fish attractant substances to the water to facilitate the catching of fish. The fish attractant device comprises a rigid, metallic body formed from a sintered metal or metal alloy including a network of interconnected, small pores interspersed throughout the body. At least a portion of the pores extend to the exterior surface of the body. The pores are filled with a fish attractant known to have fish-attracting qualities and preferably chosen from the group including anise oil, menhaden oil, rhodinol, and bacon or other animal fat. The body is, therefore, impregnated with the attractant, the attractant being exposed to the exterior surface of the body in the said portion of the pores for contact with the water in which the device is immersed.

The fish attractant device is especially adapted for use as a sinker, spinner, weight, or the like. It is preferably located immediately adjacent or on a fishing hook or even a lure such that the attractant is delivered and exposed in the area of the hook to provide a fish-attracting odor from the exterior surface of the body at a generally constant uniform, slow rate during use.

The method for forming the rigid fish-attractant devices comprises the steps of providing a rigid, sintered metal body of the type described above, immersing the body in a flowable quantity of fish attractant contained in a closeable container, and evacuating the container to a predetermined negative pressure or vacuum for a predetermined period of time to cause the fish attractant to penetrate and impregnate the body. Such method enables the impregnation of new sintered bodies as well as old, used, sintered bodies from which the fish attractant has been expended and any water removed by drying.

BRIEF DESCRIPTION OF THE DRAWINGS

FIG. 1 is a perspective view of one embodiment of the fish-attractant device mounted on a fishing line immediately ahead of a hooked plastic worm;

FIG. 2 is a side view of the fish-attractant sinker device of FIG. 1;

FIG. 3 is a perspective, exploded view of a second embodiment of the fish-attractant device together with means for securing the same to a rigid, artificial fishing lure having a plurality of hooks thereon;

FIG. 4 is a sectional view of the fish-attractant device shown in FIG. 3 mounted in the rigid fishing lure;

FIG. 5 is a side view of a third embodiment of the fish-attractant device;

FIG. 6 is a side view of a fourth embodiment of the fish-attractant device forming a swivel sinker and means for securing the same to a fishing line;

FIG. 7 is a perspective view of the first embodiment of the fish-attractant device shown in FIGS. 1 and 2 secured on a fishing line ahead of a "Mepps" type spinner lure including another spinner-type embodiment of the fish-attractant device;

FIG. 8 is a schematic illustration of the method for forming the present fish-attractant devices;

DESCRIPTION OF THE PREFERRED EMBODIMENT

Figure 9:
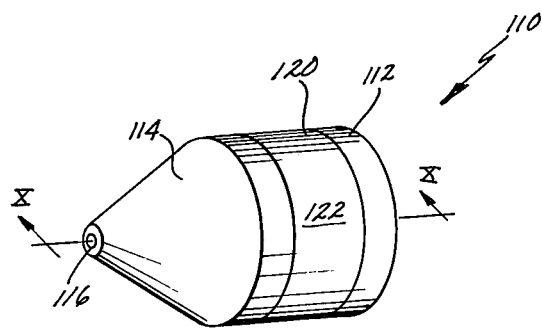
FIG. 9 is a perspective view of another embodiment of the invention illustrating a fish-attractant device embedded in a molded lead sinker body.

Referring now to the drawings in greater detail, FIGS. 1, 2, and 7 illustrate one embodiment 10 of the fish-attractant device especially adapted for use as a sinker slidably mounted on a fishing line immediately ahead of an artificial fishing lure such as that shown at 12 or 30. Attractant sinker device 10 is a bullet-like, partially cylindrical, rigid, metallic body formed from sintered metal including a right cylindrical portion 14 and a truncated, conical, tapered portion 16 extending integrally from one end of cylindrical portion 14. The conical portion 16 is coaxial with cylindrical portion 14. A circular, cylindrical hole 18 extends along the common axis of the two portions from end surface 20 of conical portion 16 into the cylindrical portion 14 where it merges with an enlarged, circular, cylindrical recess 22. Recess 22 has a diameter greater than that of hole 18 and provides a pocket or space for seating over the end of an artificial lure such as lure 12 with which the sinker is used. Recess 22 extends to the end surface 24 of cylindrical portion 14.

Each of the embodiments 10, 40, 50, 70, 85, 110, 125, and 145 of the fish-attractant device described herein is preferably formed from a quantity of sintered metallic powder molded in the appropriate shape. The process of forming sintered metallic objects is well-known. Basically, a powder of a desired metal or a mixture of a group of metal powders is compacted at a cold temperature into the desired contour after which it is sintered or heated in a controlled atmosphere to bond together the contacting surfaces of the metallic powder particles. After such heating, each of the sintered metal parts includes a network of small, interconnected pores or voids giving the overall object a desired porosity. The pores or voids are filled with the desired fish attractant utilizing the method described below. A portion of the pores extends to and communicates with the exterior surface of the body thereby connecting the interior spaces of the pores with the exterior of the body. It is this communication which allows the stored or impregnated fish attractant to be drawn to the exterior surface as the fish attractant immediately adjacent the surface is dispersed into the water to be fished. The process by which the fish attractant is brought to the surface of the object is not completely understood although it is believed to involve diffusion. It is known, however, that the same is not accomplished by frictional heating causing an expansion of the fish attractant such that it is forced to the surface of the device. The process of forming sintered metal parts is fully described in the *P/M Engineering Handbook--Powder Metallurgy*, 1972, published by the Bunting Brass & Bronze Co., Toledo, Ohio 43694, which publication is hereby incorporated by reference herein.

The sintered metal fish-attractant devices of the present invention are preferably made from powders or powder mixtures of iron, brass, bronze, copper, copper-iron, nickel-steel, nickel-silver, or aluminum molded and formed in the above sintering process. The odoriferous fish attractants which have been found preferable include anise oil, menhaden oil, rhodinol, and bacon fat or other animal fats. Other oderiferous substances may also be used. Natural, biodegradable oils such as menhaden oil have been found to be very compatible for use with the above-mentioned bronze devices as well as the other metallic bodies. However, these biodegradable substances are not compatible with plastics and do not lend themselves to use in plastic molding processes. Other fish-attractant substances can also be used. These substances are impregnated in the sintered metal bodies by the process described below. Reuse of the sintered metal bodies after the original quantity of first attractant has been expended during use is possible.

Referring now to FIG. 8, the various embodiments of the rigid, metallic, fish-attractant devices described herein are all impregnated with the desired fish attractant after formation by sintering. The various embodiments 10 through 85 are immersed in a quantity of flowable fish attractant chosen from the group including anise oil, menhaden oil, rhodinol, and bacon fat which is placed in a suitable, closeable container capable of being evacuated. In the schematic illustration of FIG. 8, the container is a rigid flask 100 having a stopper 102 with a suitable fluid conduit 104 extending from a suitable vacuum pump 106 through the stopper into the interior of the container. A quantity 108 of fish attractant is placed in the container in sufficient amount to completely cover the various fish-attractant devices.

Preferably, the fish attractant is in flowable liquid form such as a viscous oil or the like. If bacon fat or another substance which solidifies at normal room temperatures is used, it is necessary to heat container 100 to maintain the fish attractant in a flowable state.

After the sintered metal bodies are immersed in the fish attractant 108, the container is evacuated with vacuum pump 106 to a negative pressure or vacuum. It has been found that a vacuum within the range of about 20 to 25 inches of mercury is appropriate for impregnation, and this vacuum is maintained for a period of about 10 minutes for each cubic centimeter of metallic body being impregnated and filled with fish attractant. The evacuation of the air and other atmospheric gases from the container removes the air from the pores of the metallic bodies and allows the flowable fish attractant to completely fill and permeate the network of small pores within each metallic body. The fish attractant fills the pores and extends to the exterior surface thereof. When the quantity of fish attractant is expended or used up during fishing, the metal bodies can be reused by reimpregnating or filling the pores therein with another quantity of fish attractant utilizing the same method. Impregnation of the sintered metal bodies may also be achieved by soaking the bodies in the flowable fish attractant at atmospheric pressure for approximately 24–36 hours. The use of vacuum and increased temperatures during impregnation speeds the process.

The following are specific examples of impregnating one form of the sintered metal body with fish attractant. In each of the following examples, the impregnated body is of the type shown at 10 in FIGS. 1, 2, and 7. The overall length of the device is one-half inch with end 20 having a diameter of 7/32 inches and end 24 having a diameter of ⅝ of an inch. Passageway 18 has a diameter of 3/32 of an inch and is 3/16 of an inch in length. The material used is powdered brass sintered into the shape shown in these figures.

EXAMPLE 1

The above device was immersed in anise oil at room temperature, approximately 68° to 72° F., at ambient atmospheric pressure, approximately 14.7 pounds per square inch. The device was left immersed for 36 hours.

EXAMPLE 2

The above device was immersed in anise oil with a vacuum pressure of 25 inches of mercury being applied to the container holding the oil. The temperature was maintained at approximately 68° to 72° F., and the immersion at the vacuum pressure was maintained for approximately 25 minutes.

EXAMPLE 3

The above device was immersed in menhaden oil maintained at a temperature of approximately 160° F. at an ambient atmospheric pressure of approximately 14.7 pounds per square inch. The above immersion was maintained for 30 minutes.

Each of the immersed devices of the above examples was found to have approximately 95 to 99 percent of its network of small pores filled with fish attractant following, impregnation process.

As shown in FIG. 1, the sinker/fish-attractant device 10 is preferably secured to a fishing line immediately adjacent an artificial lure or bait by sliding the fishing line through longitudinal axial bore 18 and recess 22 such that conical portion 16 points away from the lure and generally in the direction in which the fishing line will be pulled when trolling. This reduces water resistance against the body. The enlarged recess 22 allows sinker 10 to slide and seat over the forward end of the artificial bait—in this case, a flexible plastic artificial worm including three hooks 26 spaced therealong. Such seating of the sinker fish-attractant device 10 over the forward end of the lure enables the odor from the fish attractant to be provided in close proximity to the hooks. It has been found preferable to have the fish-attractant device immediately in front of the hooks such that motion of the device and artificial lure through the water disperses the odor from the fish attractant around the area adjacent the hooks during fishing. Also, the device should be positioned to allow free access and contact of water to all surfaces thereof to assure proper dispersion of the fish attractant.

As shown in FIG. 7, the sinker/fish-attractant device 10 may also be used with other types of artificial lures such as the Mepps-type spinner lure 30. In this embodiment, a fish-attractant spinner 40 is substituted for the typical, nonattractant spinner in the lure 30. The Mepps spinner lure includes an elongated shaft 32 extending rearwardly from a securing member 34 to which the fish line is attached at the forward end of the device. A three-pronged or barbed hook cluster 36 extends from the rear of the shaft 32. Immediately ahead of securing member 34 is a spherical bearing bead 38 mounted on the fish line via an axial bore therethrough. Bead 38 spaces the securing portion 42 of a generally flat, spinner embodiment of the present fish-attractant device 40, which is substituted for the typical, nonattractant spinner, from the securing member 34 such that the same will spin or rotate as the line is pulled through the water being fished.

Spinner 40 is formed from sintered metal and impregnated with a fish attractant, oil, extract, or the like as will be more fully described hereinafter. Its securing portion 42 extends to one side and includes an aperture 44 passing therethrough receiving the fish line. The main portion of spinner 40 may be slightly twisted with respect to securing portion 42 to cause rotation of the spinner by the force of the water passing thereagainst when the line is pulled through the water. Accordingly, the combination of the sinker/fish-attractant device 10 and the spinner/fish-attractant device 40 provides odoriferous fish attractant immediately ahead of and adjacent the hook cluster 36 to facilitate the catching of fish.

It may be desirable to utilize a slight modification of the sinker device 10 without recess 22 in th rear thereof with spinner lures of the Mepps type shown at 30 such that the recess 22 of the sinker 10 does not jam spinner 40 over and against the bead 38 and prevent its rotational action. Also, spinner 40 may be formed in other generally flat shapes such as elongated, rectangular, and the like as desired.

Referring now to FIGS. 3 and 4, a generally square embodiment 50 of the fish-attractant device is loosely secured within a recess 54 in the underside of another rigid, wooden or plastic artificial fising lure 52. Lure 52 is of the plug type and includes a small eye bolt 56 at its forward end for securing the same to a fishing line and a pair of hook clusters 58, 60 spaced immediately ahead and immediately behind the fish-attractant device 50. Device 50 is a sintered metallic body impregnated with the desired fish attractant, the shape of a generally square nut and includes a circular aperture 62 passing axially through its thickness dimension. Device 50 is loosely secured within recess 54 by a shouldered screw 64 including a threaded portion 66 and an enlarged, cylindrical, smooth-sided portion 68 located intermediate the threaded portion 66 and head 67 of the screw. The shoulder 68 spaces head 67 away from the recess bottom and has a diameter less than that of the aperture 62 such that the device 50 can rattle or slide axially along the cylindrical portion 68. The loose fit of the device within recess 54 allows water to contact all surfaces thereof to facilitate disperison of the odoriferous fish attractant around and in the area of the hook clusters 58, 60.

Various other embodiments fo the odoriferous fish-attractant device are illustrated in FIGS. 5, 6, and 9–12. In FIG. 5, a sinker-type fish-attractant device 70 is shown similar to sinker device 10 except for the exclusion of the tapered, conical end portion. Sinker 70 is a generally right, cylindrical sintered metal body impregnated with the desired fish attractant in the manner described below and having a circular, cylindrical bore 72 extending axially therethrough from one end to the other end. The edges 76 may be beveled or chamfered to remove their sharpness.

FIG. 6 illustrates swivel-sinker embodiment 85 of the fish-attractant device including a small cylindrical sintered metal body 86 impregnated with the desired fish attractant. Body 86 is mounted on an eye bolt 88 which is secured to one end of a swivel bead 90. Another eye bolt 92 extends from the opposite end of the swivel bead and is secured to a clip or leader portion 94 which may be removably secured to an artificial fishing lure, fishing hook, or the like. Swivel bead 90 allows the lure attached to clip 94 to rotate with respect to the fish line and body 86. Eye bolt 88 is secured to a fishing line, thus positioning the fish-attractant body 86 ahead of the lure or hook such that the odoriferous fish attractant is properly dispersed ahead of and adjacent the hook for facilitating fishing.

Figure 10:
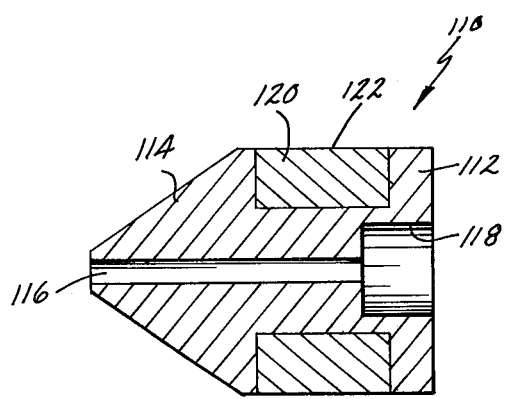
FIG. 10 is a sectional side elevation taken along plane X—X of FIG. 9.

A modified slip sinker form 110 of the fish attractant device is illustrated in FIGS. 9 and 10. Slip sinker 110 includes a right cylindrical body portion 112 in a tapered conical portion 114 extending outwardly from one end of the cylindrical portion 112 along a common central axis. A central passageway for receiving a fish line allowing the sinker to be slidably mounted thereon extends along the common axis form the tapered end towards the larger end. Passageway 116 includes an enlarged diameter portion 118 at the larger end such that the sinker can slip over the nose of a lure or hook to bring it in close proximity therewith. Portions 112 and 114 of slip sinker 110 are molded integrally from lead and thus can be easily shaped into a desired form. The tapered form illustrated is provided in order to reduce water resistance allowing the sinker to be moved through the water more easily. The use of lead allows the taper to be greater than with sintered metal bodies bringing it very close to the diameter size of the passageway 116. Such tapered form also reduces the chances for snagging on underwater obstacles. Lead is also advantageous because it is inherently noncorrosive in water and is heavy giving it excellent sinker qualities.

Embedded within and retained by the molded lead, cylindrical body portion 112 of sinker 110 is an annular, cylindrical fish-attractant device 120 formed from powdered bronze or brass and sintered as described above into the annular shape. The annular shape allows the device to extend around the exterior of the right cylindrical portion 112 such that at least the outer circumferential portion 122 of device 120 is exposed to provide fish attractant immediately adjacent the hook ahead of which the sinker is mounted. It will be appreciated that the lead portions and sintered metal fish-attractant portions can be formed in various shapes and molded together to form other types of sinkers, fish-attractant lures and the like.

Figure 11:
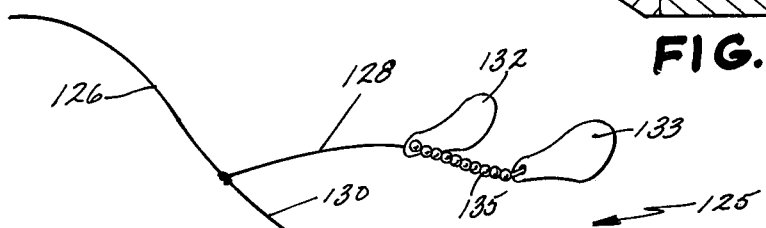
FIG. 11 is a perspective view of a spinner bait embodiment of the invention shown partially in cross section.

Yet another form of the invention is illustrated in FIG. 11 as used with a spinner bait 125. Spinner bait 125 is secured to the end of a fish line 126 and includes a wire yoke having branches 128 and 130. A spinner 132 is mounted for rotation at the end of branch 128 while another spinner 133 is secured on a flexible chain 135 fastened to the end of branch 128. A small cylindrical annular fish-attractant device 131 is secured on the shank portion 138 of a hook 134. Hook 134 includes a barb 136, a lure skirt 137, and shank porton 138 at the upper end of which is secured fish-attractant device 131. Fish-attractant device 131 includes a central aperture 140 through which the shank portion is slipped. Lead 142 is molded around the fish-attractant device such that the majority of at least the outer circumferential surface of device 131 is exposed while the lead holds the device in a fixed position on the upper end of the shank 138. The lead thus secures the device in place and provides necessary integral weight for holding the hook in a desired position in the water. It will be understood that positioning the device as shown in FIG. 11 assures that it remains in proximity to the hook in order to efficiently attract fish to the hook.

Figure 12:
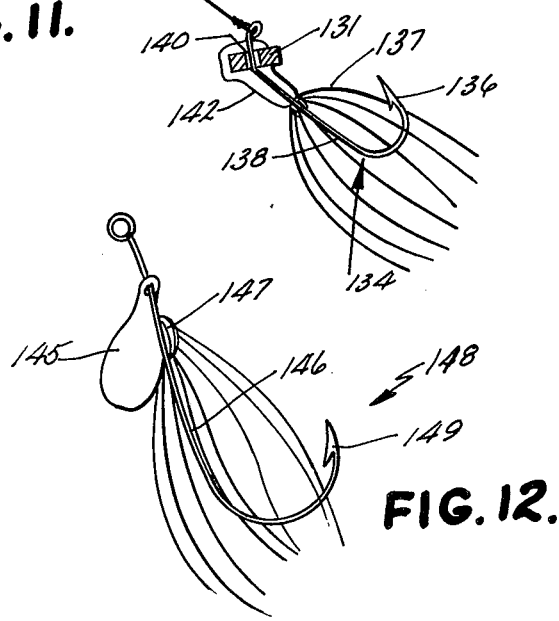
FIG. 12 is a perspective view of another embodiment of the invention soldered on the shank portion of a hook.

FIG. 12 illustrates yet another embodiment of the invention including a spoon-shaped fish-attractant device 145 soldered or otherwise secured to the shank portion 146 of a hook 148. A lure skirt 147 may also be included on the shank 146 to partially hide the hook. Spoon-shaped device 145 is generally elongated and flat and includes an aperture therethrough for receiving the hook after which it is soldered in place. As with the device illustrated in FIG. 11, soldering of the spoon-shaped device 145 on the hook shank assures that fish attractant will be provided immediately adjacent the barb portion 149 of hook 148.

The present fish-attractant device in any of its various embodiments delivers a constant, uniform quantity of fish-attractant substance to the area surrounding the fishing hook to attract fish to the hook. It has been found with actual testing that embodiment 10 of the device, the bullet-shaped sinker, delivers sufficient quantities of odoriferous fish attractant over at least 4½ weeks of continuous submersion in water.

The present invention and method allows the formation of rigid odoriferous fish attractant devices which are less expensive and more versatile than previously known flexible devices which have been unable to properly deliver sufficient quantities of fish attractant over an extended period. The rigid metallic bodies have sufficient inherent weight to be used as sinkers immediately ahead of artificial lures as well as spinners and devices attached to the existing bodies of other artificial lures. When the quantity of fish-attractant substance is expended from the sintered metal body, the bodies may be reimpregnated with the substances using the described method thereby enabling reuse of the devices for an indefinite period.

Heretofore, sintered metal objects have been used as bearings wherein lubrication oils are impregnated in rigid metallic bearing bodies, the present invention is, in fact, radically different. Oil-impregnated bearings are described in many patents including for instance, U.S. Pat. No. 2,661,238. In such oil-impregnated bearing bodies, friction produced at the bearing surfaces heats the bearing body which in turn heats and expands the oil impregnating the same. Expansion of the oil forces the oil out of the metal providing lubrication. However, in the present invention, no heating of the rigid, metallic fish-attractant device occurs by friction or by any other means. Dispersion of the attractant from the exterior pores of the device causes more attractant to be drawn to the surface from the internal pores. Accordingly, although the physical functioning of the present invention is not completely understood, it is known that its function is not based on the same physical principles as are the well-known oil-impregnated lubricious bearings.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A fish-attractant device comprising a rigid, sintered metal body formed from metal powder and including a network of interconnected, small pores interspersed throughout said body, at least a portion of said pores extending into communication with the exterior surface of said body; said pores containing a fish attractant such that said body is impregnated with said attractant, said attractant being exposed to the exterior surface of said body in said portion of said pores for contact with the water in which said device is immersed, said attractant being delivered and exposed at said exterior surface of said body at a generally constant, uniform, slow rate during use to provide a fish-attracting odor facilitating the catching of fish.

2. The device of claim 1 wherein said body is a sinker adapted to be attached to a fishing line immediately ahead of a fishing lure, hook, or the like such that said odor of said attractant pervades the entire area around the fishing lure, hook, or the like, said sinker having a predetermined weight to hold the fishing line under water; and means for securing said sinker to a fishing line.

3. The device of claim 2 wherein said sinker is a cylindrical body having an axis, two ends, and a tapered portion on one end such that said body has a bullet-like shape and a hole extending along said axis completely through said body for receiving a fishing line therethrough, said tapered end adapted to extend toward the direction of motion in which the lure, hook, or the like is pulled through the water to reduce fluid resistance against said body.

4. The device of claim 3 wherein said hole includes a first portion having a first diameter and extending from said one end partially through said sinker body, and a second portion having a diameter larger than said first diameter and extending the remaining distance through said sinker body to the other of said ends of said body.

5. The device of claim 2 wherein said hole includes a first portion having a first diameter and extending from said one end partially through said sinker body, and a second portion having a diameter larger than said first diameter and extending the remaining distance through said sinker body to the other of said ends of said body.

6. The device of claim 1 wherein said body is adapted to be secured directly to a fishing lure, said body including an aperture extending therethrough; fastening means adapted to extend through said aperture in said body for attaching said body to a fishing lure.

7. The device of claim 6 wherein said body is generally square and has a thickness less than its length and width dimensions; said aperture extending through its thickness.

8. The device of claim 6 wherein said body has a predetermined thickness; said fastening means includes a screw having a head and shank portions; said shank portion having a first threaded portion with a predetermined diameter and adapted to be driven into a fishing lure and a second, cylindrical portion having a diameter larger than that of said first portion, a length greater than said body thickness, and located intermediate said head and first shank portions to space said head portion away from said lure a distance greater than said body thickness; said second shank portion diameter being less than the area of said body aperture whereby when said body is received on said screw, it will freely slide and rattle on said second shank portion as said lure is pulled through the water to assure contact of the water with all surfaces of said body.

9. The device of claim 6 wherein said body aperture has a predetermined cross-sectional area; said fastening means including shank means received through said body aperture and having a cross-sectional area less than that of said body aperture for allowing said body to slide freely and rattle thereon to assure contact of the water through which said lure is pulled with all surfaces of said body.

10. The device of claim 1 wherein said body is included on an elongated swivel sinker having two ends, said swivel sinker including securing means for attaching said swivel sinker to a fishing line on one end, means at the other end for mounting said body thereon and for attaching a fishing lure thereto, and means for connecting said securing means and said mounting and attaching means including a swivel member allowing said mounting and attaching means to rotate with respect to said securing means.

11. The device of claim 1 wherein said body is a generally flat spinner including an aperture extending therethrough for receiving a fish line.

12. The device of claim 1 wherein said body is formed from a sintered metallic powder chosen from the group including powders of iron, brass, bronze, and mixtures of powders of copper and iron, nickel and silver, and nickel and steel.

13. The device of claim 1 wherein said fish attractant is chosen from the group including anise oil, menhaden oil, rhodinol, and bacon grease.

14. The device of claim 1 in combination with a fish hook of the type including means for securing said hook to a fish line and a barb portion adjacent said securing means; said body being attached to said hook adjacent said barb portion and fastening means for attaching said body to said hook including a quantity of lead molded around a portion of said body and a portion of said hook to secure said body to the hook; said body having a portion of its surface exposed to the water; said lead and body together providing inherent weight forming a sinker on the hook.

15. The device of claim 14 wherein said fish hook is of the type including a shank portion and a curved barb, said body having a central aperture therethrough for receiving the shank of said hook, said lead being molded about said body and shank of the hook.

16. The device of claim 1 in combination with a lead sinker, said sinker including a sinker body and an aperture passing through said sinker body; said fish-attracting device being embedded in said sinker body such that at least a portion of its exterior surface is exposed at the surface of said sinker body.

17. The device of claim 16 wherein said sinker body is generally bullet-shaped and includes a generally right cylindrical portion and a tapered conical portion integral therewith; said aperture extending along the axis of said tapered conical and right cylindrical portions; said fish attractant device comprising a generally annular ring molded within the right cylindrical body portion of said sinker such that the outer circumferential surface of the annular ring is exposed at the surface of said sinker body portion.

18. The device of claim 17 wherein said aperture includes a first portion having a first diameter and extending from the tapered conical end of said sinker body through said sinker body, and a second portion having a diameter larger than said first diameter and extending the remaining distance through said sinker body to the other end of said body.

19. The device of claim 14 wherein said hook includes a shank portion and a curved barb; said body being generally spoon-shaped and secured to said shank portion of said hook generally at an angle to said shank portion.

20. A method for forming a rigid fish attractant device comprising the steps of:
1. providing a rigid, sintered metallic body having a network of interconnected, small pores interspersed throughout said body, at least a portion of said pores extending to and in communication with the exterior surface of said body;
2. immersing said rigid, sintered metal body in a flowable quantity of fish attractant contained in a closeable container;
3. evacuating said container to a predetermined negative pressure or vacuum for a predetermined period of time causing said fish attractant to penetrate and impregnate said body by filling said network of pores whereby, when said body is immersed in water during fishing, said attractant will be released into the water at a constant, slow rate from said portion of said pores at the exterior of said body in order to attract fish thereto.

21. The method of claim 20 wherein said body is immersed in a quantity of fish attractant chosen from the group including anise oil, menhaden oil, rhodinol, and bacon grease.

22. The method of claim 20 including forming said body from a sintered metallic powder chosen from the group including powders of iron, brass, bronze, aluminum, and mixtures of powders of copper and iron, nickel and silver, and nickel and steel.

23. The method of claim 20 wherein said container is evacuated with a vacuum pump to a vacuum within the range of about 20 to 25 inches of mercury.

24. The method of claim 23 wherein said body has a predetermined volume measured in cubic inches, said container is evacuated for a period of about 10 minutes for each cubic centimeter of said body immersed in said fish attractant in said container.

25. A method for fishing comprising the steps of:
1. providing a fish-attractant device including a rigid, sintered metal body having a network of interconnected, small pores interspersed throughout said body, at least a portion of said pores extending to and in communication with the exterior surface of said body;
2. immersing said rigid, sintered metal body in a flowable quantity of fish attractant contained in a closeable container;
3. evacuating said container to a predetermined negative pressure or vacuum for a predetermined period of time causing said fish attractant to penetrate and impregnate said body by filling said network of pores;
4. attaching said fish-attractant device to a fishing line adjacent at least one hook for catching fish;
5. immersing said device, line, and hook in the water to be fished such that said attractant is released into the water at a constant, slow rate from a portion of said pores at the exterior of said body in order to attract fish to said hook for catching the same.

* * * * *